R. CALLAGHAN.
SIGNAL DEVICE.
APPLICATION FILED JUNE 27, 1916.
1,265,425.
Patented May 7, 1918.
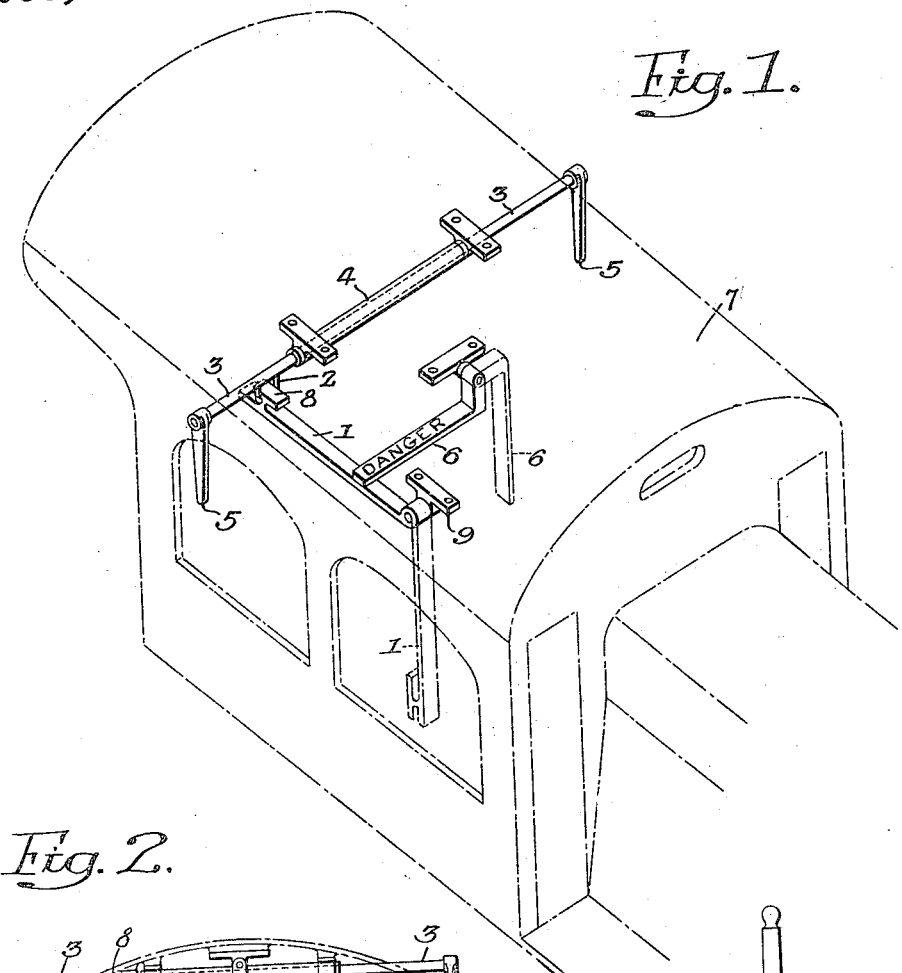
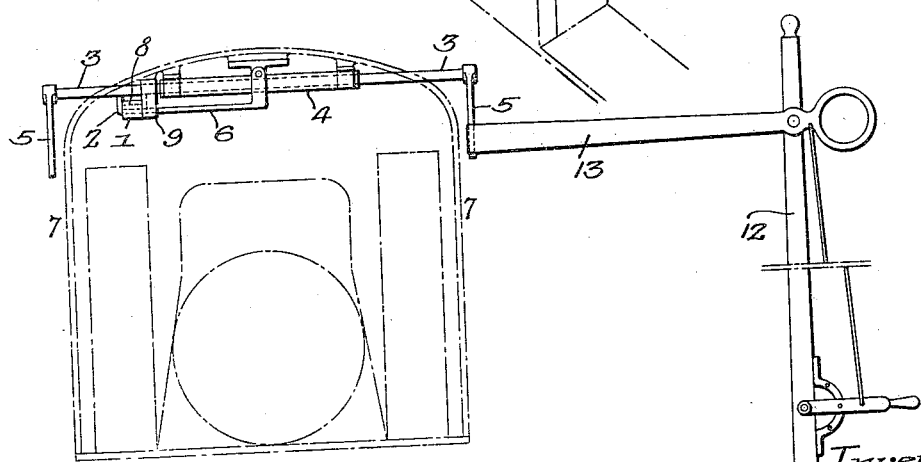
Inventor:-
Robert Callaghan.
by his Attorneys.
Howson & Howson

UNITED STATES PATENT OFFICE.

ROBERT CALLAGHAN, OF PHILADELPHIA, PENNSYLVANIA.

SIGNAL DEVICE.

1,265,425.

Specification of Letters Patent.

Patented May 7, 1918.

Application filed June 27, 1916. Serial No. 106,173.

*To all whom it may concern:*

Be it known that I, ROBERT CALLAGHAN, a citizen of the United States, residing in Philadelphia, Pennsylvania, have invented Signal Devices, of which the following is a specification.

One object of my invention is to provide a simple, easily operated and effective device for calling the attention of an engineer of a locomotive or electric train to the condition of a signal or for directing his attention for some other purpose;—the invention contemplating a novel combination of parts for visually giving a warning in the cab of an engine or car as well as physically touching or striking the engineer with the same idea in view.

I further desire to provide a signaling device designed to be mounted in a cab or car and including a visual signal dependent for its operation upon the condition of a signaling member arranged to strike or contact with some part of the body of the engineer under predetermined conditions, the design of the parts being such that said device may be put in operation by any suitable agency outside of the cab or car, preferably from a point along the side of the track or right of way.

These objects and other advantageous ends I secure as hereinafter set forth, reference being had to the accompanying drawings, in which, Figure 1 is a fragmentary perspective view illustrating my invention as applied in its simplest form to the cab of a locomotive; and Fig. 2 is an elevation, partly in vertical section, further illustrating the invention.

In the above drawings 3 represents a shaft or spindle mounted in suitable bearings attached to or supported by the roof 7 of the cab so as to extend transversely thereof, one or both ends of said spindle extending outside of the cab and at least one of them being provided with a projecting arm 5. The opposite end of the spindle is provided with a projecting arm in the form of a wire loop or slotted structure 2 designed to coöperate with either branch of a T-shaped lug 8 mounted on the end of a pivotally mounted arm 1. This latter is mounted on a pivot projecting from a bearing 9 also carried by the roof of the cab, and is normally maintained in a raised horizontal position as shown in full lines by reason of the engagement of either branch of its lug 8 by the loop or slotted member 2.

When, however, by reason of its disengagement by said loop or member it is left unsupported, it swings down under the action of gravity into a substantially vertical position, being so placed that as it falls from its elevated or normal position to its vertical position, it will engage some part of the body of an engineer occupying the customary operating position within the cab, preferably striking his back.

Also carried by the roof of the cab is a bearing 10 providing a pivot on which is rotatably mounted one end of an arm 6 of such length and so mounted that it may be normally maintained in a raised and substantially horizontal position by the alarm bar 1, as long as the latter is likewise raised. The arm 6 is of such length and is so mounted that it may be normally maintained in a raised horizontal position by the alarm bar 1, as long as this is likewise raised. Said arm 6 is usually painted a red color and may be inscribed with any warning legend as desired.

The arm 5 on the spindle 3 projects at one side of the cab or car, and while it may be moved so as to turn said spindle by being struck by any relatively stationary object along the right of way, I preferably provide a signal post 12 adjacent the track and on this mount a semaphore arm or bar 13 designed to be raised to a horizontally projected position to give a danger indication. The post 12 is so placed that when the arm is raised, its end will strike the projecting arm 5 on any engine or car passing it, thereby turning the spindle 3 and causing the slotted member 2 to disengage the lug 8.

Not only is the bar 1 thus disengaged and caused to attract the attention of the engineer to the fact that he has run by or disregarded a signal, but its release also frees the arm 6, which thereupon likewise swings down, visually warning the engineer.

For purposes of my invention it is immaterial whether the signal arm 13 be raised by hand or power or whether or not it forms part of an automatic system, since in any case when in the danger position it strikes the arm 5 and releases the physical signal arm 1 as well as the visual signal arm 6. Obviously when the arm 13 is in a safety or caution position it will not strike the arm 5 of a passing engine or train but will rest in an inclined or vertical position. In case the train should run backward on the track, the slotted member 2 of the spindle 3 may be placed in engagement with the opposite branch of the T-shaped lug 8 so as to be disengaged therefrom when the arm 8 is struck and moved in a direction opposite that in which it moves under normal conditions.

I claim:—

1. The combination of a vehicle cab; a rotatable shaft therein extended beyond one side of said cab; an arm on the extended end of said shaft; with a signal arm in the cab normally held in a raised position by said shaft and releasable when the latter is turned through a predetermined angle.

2. The combination of a vehicle cab; a member for striking an engineer in the cab and normally held in a set position; means for releasing said member; with a visual signal member normally maintained in a set position by said first member and releasable therewith.

3. The combination with a vehicle cab of a pivotally mounted bar constituting a visual signal; a member normally holding said bar in a set position and mounted to strike the engineer when released; means for normally holding said member in a set position; and a device external to the cab for actuating said means to release said bar and member.

4. The combination of a vehicle cab; a rotatable shaft therein extended beyond one side of the cab; an arm on the outer end of said shaft; a second arm on the shaft within the cab; and a pivotally mounted signal arm normally held in a raised position by said second arm but released therefrom when the first arm is operated to turn the shaft.

5. The combination in a vehicle cab of a member mounted to strike the engineer when released and including two oppositely projecting portions; means for maintaining said member in a set position including a structure capable of engaging either of said projecting portions; with a device for actuating said means to cause said structure to disengage and thereby release said member under predetermined conditions.

6. The combination of a vehicle cab; a member normally held in a set position; a visible signal member normally retained in a set position by said first member and releasable therewith; with means external to the cab and independent thereof for causing release of the first member.

ROBERT CALLAGHAN.

Copies of this patent may be obtained for five cents each, by addressing the "Commissioner of Patents, Washington, D. C."